United States Patent
Foulds et al.

(10) Patent No.: US 8,483,511 B1
(45) Date of Patent: Jul. 9, 2013

(54) METHODS AND APPARATUS FOR CORRELATING IMAGE FRAME STATISTICS WITH IMAGE FRAMES

(71) Applicant: Marvell International Ltd., Hamilton (BM)

(72) Inventors: Christopher T. Foulds, Austin, TX (US); Joel Rosenzweig, Marlborough, MA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/708,631

(22) Filed: Dec. 7, 2012

Related U.S. Application Data

(63) Continuation of application No. 12/260,956, filed on Oct. 29, 2008, now Pat. No. 8,331,728.

(60) Provisional application No. 60/984,916, filed on Nov. 2, 2007.

(51) Int. Cl.
  *G06K 9/36* (2006.01)
(52) U.S. Cl.
  USPC .......................................... 382/286; 382/305
(58) Field of Classification Search
  USPC ............. 382/100, 286, 305, 306; 348/231.99, 348/231.2, 231.3, 231.6
  See application file for complete search history.

(56) References Cited

U.S. PATENT DOCUMENTS

| | | | |
|---|---|---|---|
| 7,916,976 B1 | 3/2011 | Kedikian | 382/305 |
| 2004/0141069 A1 | 7/2004 | Nakami | 348/231.6 |

*Primary Examiner* — Andrew W John

(57) ABSTRACT

Embodiments of the present invention provide a method that comprises receiving an image frame, determining an image frame identification (ID) for the image frame, collecting image frame statistics comprising at least one type of statistic from the image frame, and correlating the image frame statistics with the image frame ID.

20 Claims, 3 Drawing Sheets

METHODS AND APPARATUS FOR CORRELATING IMAGE FRAME STATISTICS WITH IMAGE FRAMES

CROSS REFERENCE TO RELATED APPLICATIONS

The present disclosure is a continuation of and claims priority to U.S. patent application Ser. No. 12/260,956, filed Oct. 29, 2008, now U.S. Pat. No. 8,331,728, issued Dec. 11, 2012, which claims priority to U.S. Patent Application No. 60/984,916, filed Nov. 2, 2007, which are incorporated herein by reference.

TECHNICAL FIELD

Embodiments of the present invention relate to correlating information obtained from a data packet with an ID of the data packet, and more particularly, to correlating statistics collected from an image frame with an image frame identification.

BACKGROUND

Many times, images, such as images taken by a digital camera or the digital camera component of a cellular phone, need to be corrected, enhanced, etc. A hardware image statistics collection unit collects statistics for data related to an image frame that has been received from the camera. The statistics are used by software to implement such functions as auto exposure, auto focus, auto white balance, and long exposure noise reduction.

A statistics collection unit may collect statistics on all three color components (R, G, B) simultaneously and for different programmable frame regions. A typical set of statistics may include total color intensity value, maximum and minimum color value, a histogram of received color values and dark pixel values for noise characterization. Statistics collections operations may be performed on the incoming camera data typically after dead pixel correction.

The statistics collection unit is generally not required to be a destination for data, but instead snoops image data as it passes by on the image data bus. The statistics collection unit does not store the image data, but rather it stores statistics derived from the data, generally only temporarily. Therefore, statistics collection may be performed in parallel with other operations or as a stand-alone operation. While data is received on the image data bus, statistics are calculated and then stored in a memory array and/or registers accessible by software and/or firmware.

The general behavior of a statistics collection unit is to collect data for one frame and then block new data until the statistics memory has been read and cleared, i.e., the statistics have been transferred to system memory and the statistics have been cleared from the temporary memory of the statistics collection unit. Alternatively, a statistics collection unit could be configured to collect data over multiple frames, and at the end of a programmed number of frames, new data may be blocked until after the statistics memory has been read and cleared.

As an example, a statistics collection unit may collect statistics for eight regions of an image frame for each color component. It generally collects the total color intensity value, maximum and minimum color value and a 32-bit histogram of received color values. As previously mentioned, the statistics may be stored in a combination of registers and memory arrays. In order for software and/or firmware to use the statistics, the data must be transferred from the local statistics collection unit memory to the system main memory via, for example, a direct memory access (DMA) operation. Those skilled in the art will understand that there are other ways to transfer the data from the local statistics collection unit memory to the system main memory. For example, the data from the local statistics collection unit memory may be transferred to the system main memory via programmed input/output (PIO). The local memory of the collection unit must then be cleared after the statistics data are transferred to main memory so that statistics for a new frame may be collected.

At the end of an image frame, the statistics collection unit generally must block the updating of the statistics until after the data is transferred to system memory and the local statistics memory is reset. The statistics collection unit may not be able to capture data for every frame because of the time required to transfer the data from local memory to system memory and the time required to clear the statistics. It may only be able to collect statistics for every other frame or possibly even worse, depending upon the memory transfer time, the memory clearing time, the delay between frames, the size of frames, and the frame rate. In some cases, the software algorithms may need to associate a set of image statistics to the specific image frame from which it was captured. There may be multiple image frames and multiple sets of image statistics in memory, and in this case, the software needs some way to determine which set of statistics belongs to which frame.

In the prior art, there needed to be some way to determine the frame to which a set of statistics corresponds and thus, the image statistics collection unit needed to guarantee a specific frame rate or else the software for statistics collection would need to receive an interrupt every time a new image frame and corresponding set of statistics were written to system memory. Such an implementation is dependent upon the reliability of the hardware to store the statistics at a consistent rate or on the ability of the software to properly match the statistics with the image data using an interrupt mechanism. Such a method is generally unreliable and costly in the case of interrupting the software for every set of image statistics.

SUMMARY

The present invention provides a method that comprises providing an image frame, determining an image frame identification (ID) for the image frame, collecting image frame statistics comprising at least one type of statistic from the image frame, and correlating the image frame statistics with the image frame ID. In accordance with some embodiments, the image frame ID is determined by collecting the image frame ID from the image frame. In accordance with other embodiments, the image frame ID is determined by generating the image frame ID.

In accordance with various embodiments, the method further comprises temporarily storing the image frame statistics.

In accordance with various embodiments, the method further comprises temporarily storing the image frame.

In accordance with various embodiments, the method further comprises forwarding the image frame to system memory, and forwarding the image frame statistics to system memory.

In accordance with various embodiments, the image frame and the image frame statistics are forwarded to system memory simultaneously. In accordance with various other embodiments, the image frame and the image frame statistics are forwarded to system memory at separate times.

In accordance with various embodiments, the image frame and the image frame ID are stored in separate system memory locations.

In accordance with various embodiments, the image frame and the image frame ID are stored together in a system memory location.

In accordance with various embodiments, the image statistics and image frame ID are stored together in a system memory location.

In accordance with various embodiments, the image statistics and the image frame ID are stored in separate memory locations.

In accordance with various embodiments, the image frame statistics comprise multiple types of statistics.

In accordance with various embodiments, multiple image frames are received, an ID is determined for each image frame, at least one set of image frame statistics comprising at least one type of statistic are collected from the multiple image frames, and the image frame statistics are correlated with the multiple image frame IDs.

The present invention also provides an apparatus comprising an image frame identification (ID) block for determining an image frame ID, a statistics collection block for collecting image frame statistics comprising at least one type of statistic from the image frame, and a correlation block for correlating the image frame statistics with the image frame ID.

In accordance with various embodiments, the correlation block comprises a temporary image data statistics storage block for temporarily storing the image frame statistics.

In accordance with various embodiments, the apparatus further comprises a temporary image frame storage block for temporarily storing the image frame, wherein the image frame storage block is also configured to correlate an image frame with a corresponding image frame ID.

In accordance with various embodiments, the image frame ID block determines the image frame ID by collecting the image frame ID from the image frame.

In accordance with various embodiments, the image frame ID block determines the image frame ID by generating the image frame ID. In accordance with some embodiments, the image frame ID block comprises a counter.

In accordance with various embodiments, the apparatus further comprises a direct memory access (DMA) for forwarding the image frame to a system memory and for forwarding the image frame statistics to the system memory.

In accordance with various embodiments, the DMA forwards the image frame and the image frame statistics to the system memory simultaneously.

In accordance with various embodiments, the DMA forwards the image frame and the image frame statistics to the system memory at separate times.

In accordance with various embodiments, the image frame statistics comprise multiple types of statistics.

In accordance with various embodiments, the apparatus further comprises a programmed input/output (PIO) for forwarding the image frame to a system memory and for forwarding the image frame statistics to the system memory.

In accordance with various embodiments, the PIO forwards the image frame and the image frame statistics to the system memory simultaneously.

In accordance with various embodiments, the PIO forwards the image frame and the image frame statistics to the system memory at separate times.

In accordance with various embodiments, the image frame ID block is configured to determine an ID for each image frame of multiple image frames, the statistics collection block is configured to collect at least one set of image frame statistics comprising at least one type of statistic from the multiple image frames, and the correlation block is configured to correlate the image frame statistics with the multiple image frame IDs.

The present invention also provides an article of manufacture that may be employed to implement one or more methods as disclosed herein. For example, in exemplary embodiments, an article of manufacture may comprise a storage medium and a plurality of programming instructions stored in the storage medium and adapted to program an apparatus to enable the apparatus to determine a frame ID for an image frame and to correlate the frame ID with collected statistics for the image frame.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The present invention provides systems and methods for assigning a, for example, 32-bit frame identification number (frame ID) to each frame and then storing the frame ID with the image data, as well as with the statistics data. The frame ID may then be used by software and/or firmware to match the statistics data with the image data for which they were collected. Those skilled in the art will understand that frame ID size may be smaller or larger than 32 bits.

Figure 1:
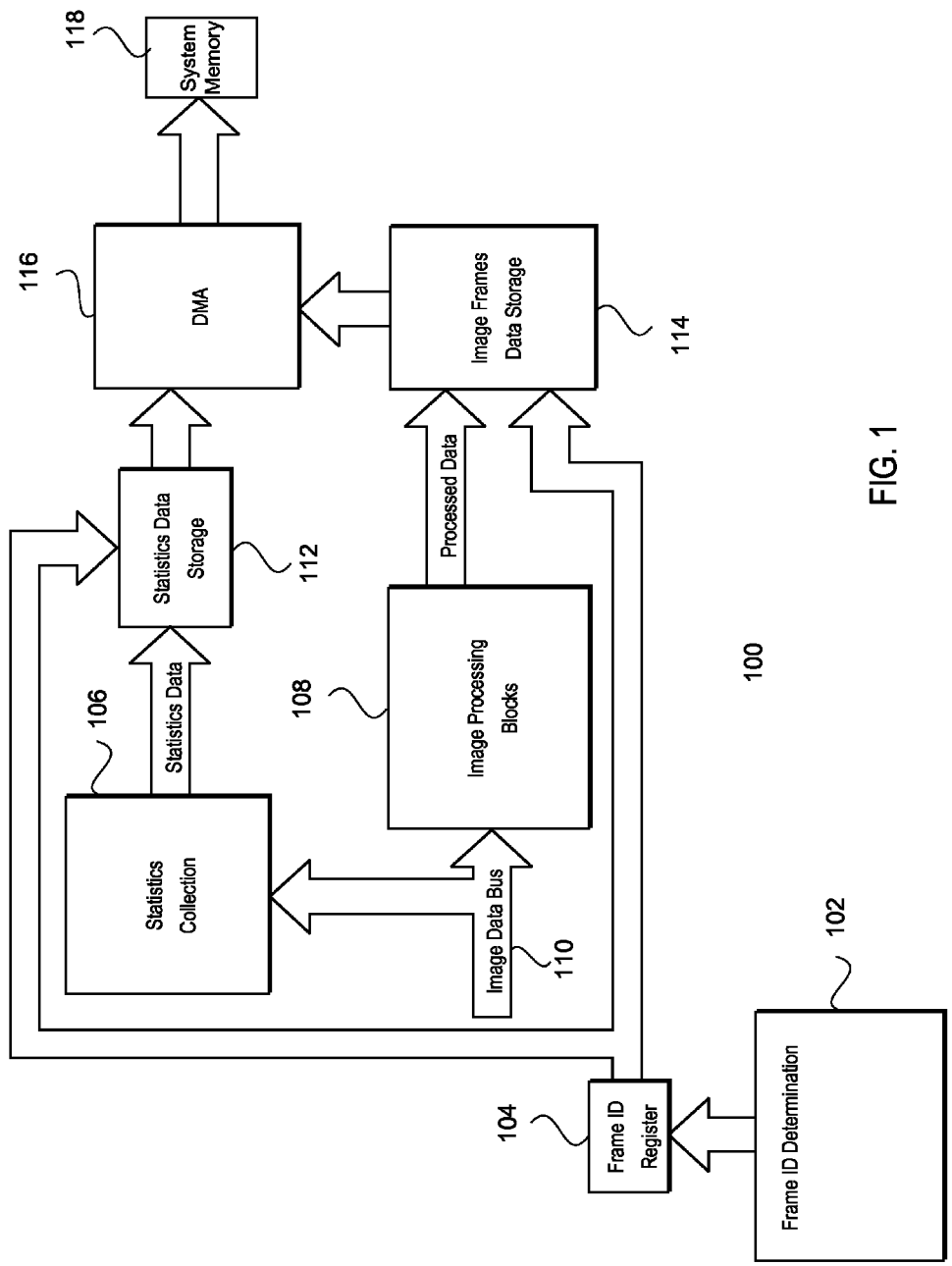
FIG. 1 schematically illustrates an image statistics collection system, in accordance with various embodiments of the present invention.

FIG. 1 illustrates an example of a system 100 for collecting statistics and correlating the statistics with a frame image ID, in accordance with various embodiments of the present invention. The exemplary system 100 includes an image frame ID determination block 102 and a frame ID register 104 that determine and store an image frame ID for an image frame. Those skilled in the art will understand that the image frame determination block 102 and image frame register 104 may be a single block. The frame ID determination block 102 may be in the form of, for example, a counter, that is used to generate a frame ID. Alternatively, the frame ID determination block 102 may include logic configured to extract a frame ID from received image frame data that already includes an image frame ID.

The received image frame data may be provided to a statistics collection unit 106 and an image processing block or blocks 108 via an image data bus 110. The statistics may be gathered by the statistics collection unit 106 and the statistics data may be forwarded to a temporary statistics data storage 112. The image frame data may also be processed by the image processing block 108 in order to correct, improve or enhance the image frame data as desired or needed. The processed image frame data may then be forwarded to a temporary image frames data storage 114. The frame ID is provided to the statistics data storage 112 and the image frames data storage 114 so that the image statistics may be correlated with the image frame ID, and thus, the appropriate image frame.

In accordance with various embodiments, one set of image statistics may be stored in statistics data storage 112 for multiple image frames and the statistics may be correlated to the multiple image frame ID numbers and thus, multiple image frames. There are several ways to correlate a multi-frame statistics set to the multiple image frames. For example, if received image frames are numbered sequentially, only the first or last frame ID needs to be stored and the other frame ID numbers may be calculated based on the number of frames used for collecting the statistics. If the received imaged frames are not numbered sequentially, then all frame ID numbers may be stored with the image statistics. Thus, statistics may be correlated to multiple image frames.

The image frame statistics and the processed image frame data may then be forwarded to a direct memory access (DMA) 116, which may then forward the image frame statistics and the image frame data to system memory 118. Those skilled in the art will understand that there are other ways to transfer the image frame statistics and the processed image frame data to the system memory 118. For example, the image frame statistics and the processed image frame data may be transferred to the system memory 118 via programmed input/output (PIO).

Those skilled in the art will understand that the statistics data storage 112 that temporarily stores the image frame statistics before forwarding it on to the DMA 116 may be eliminated if desired. In such an embodiment, the image frame ID may be provided to the statistics collection unit 106, which may then correlate the image frame statistics with the image frame ID. Likewise, the image frame data need not be temporarily stored in the image frames data storage unit 114, if desired. In such an embodiment, the image frame ID may be provided to the image processing blocks 108 in order to correlate the image frame with the image frame ID. Additionally, the exemplary system 100 illustrated in FIG. 1 may also operate in a raw mode, i.e., the image frames may not be processed if desired and thus, the image frame ID may be correlated with the image frame at either the image processing block (which does not do any processing in such an embodiment or mode of operation), the image frames data storage 114, if included, or the DMA 116. Thus, the system illustrated in FIG. 1 may operate in a processing mode or a raw mode as desired.

When the image frame data and/or the image statistics are stored in system memory, the image frame ID may be stored in the same memory location or may be stored separately using a pointer. If it is stored with the image frame data and/or the collective image statistics, then the image frame ID may generally be placed at the beginning or at the end of the frame.

Figure 2:
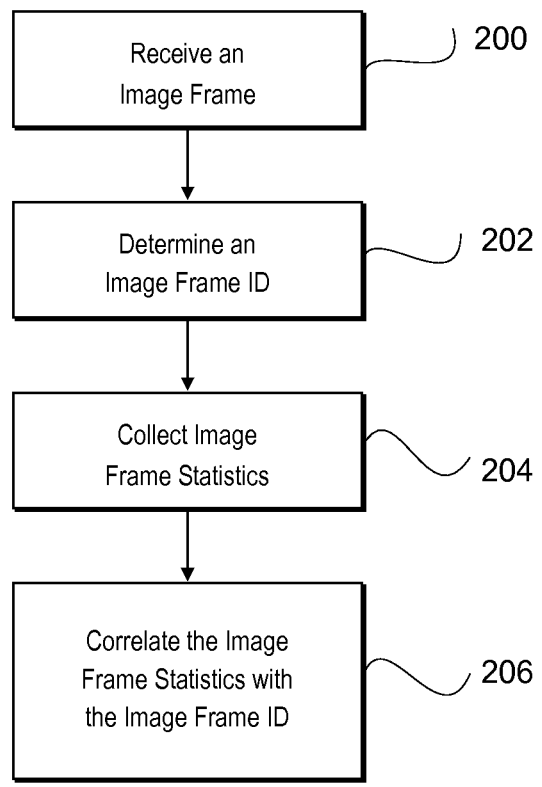
FIG. 2 is a flowchart illustrating several operations of the image statistics collection system, in accordance with various embodiments of the present invention.

Referring to FIG. 2, in accordance with various embodiments of the present invention, image frame data may be received at an image frame ID determination block or register and an image data bus, at 200. At 202, the frame ID determination block may determine an image frame ID by either generating an image frame ID or extracting the image frame ID from a frame start packet of the image frame data. The frame start packet may generally be included with cameras that are implemented using a MIPI (Mobile Industry Processor Interface Alliance) CSI-2 (camera serial interface) compliant sensor. When the frame ID is generated internally by the system, the generation may be generated by a counter that increments the count value for every frame and stores the count in the frame ID register.

At 204, the system may then collect image frame statistics with a statistics collection unit. The statistics may then be correlated with the image frame ID, at 206.

The data in the frame ID register may then be written to statistics data storage and image frames data storage. The storage units may then correlate the frame ID with the statistics data and the image frames data. As previously mentioned, other units within the system may be used for the correlation if the system does not include the temporary storage units.

The frame ID may be transferred along with the statistics data and the image frame data to system memory via a direct memory access (DMA). Once again, those skilled in the art will understand that there are other ways to transfer the image frame statistics and the processed image frame data to the system memory 118. For example, the image frame statistics and the processed image frame data may be transferred to the system memory 118 via programmed input/output (PIO). Thus, each image data frame and each set of image statistics has a unique frame ID stored with it in system memory. When software reads the statistics, it may read the frame ID and then match the statistics with the image data that has the same frame ID.

Figure 3:
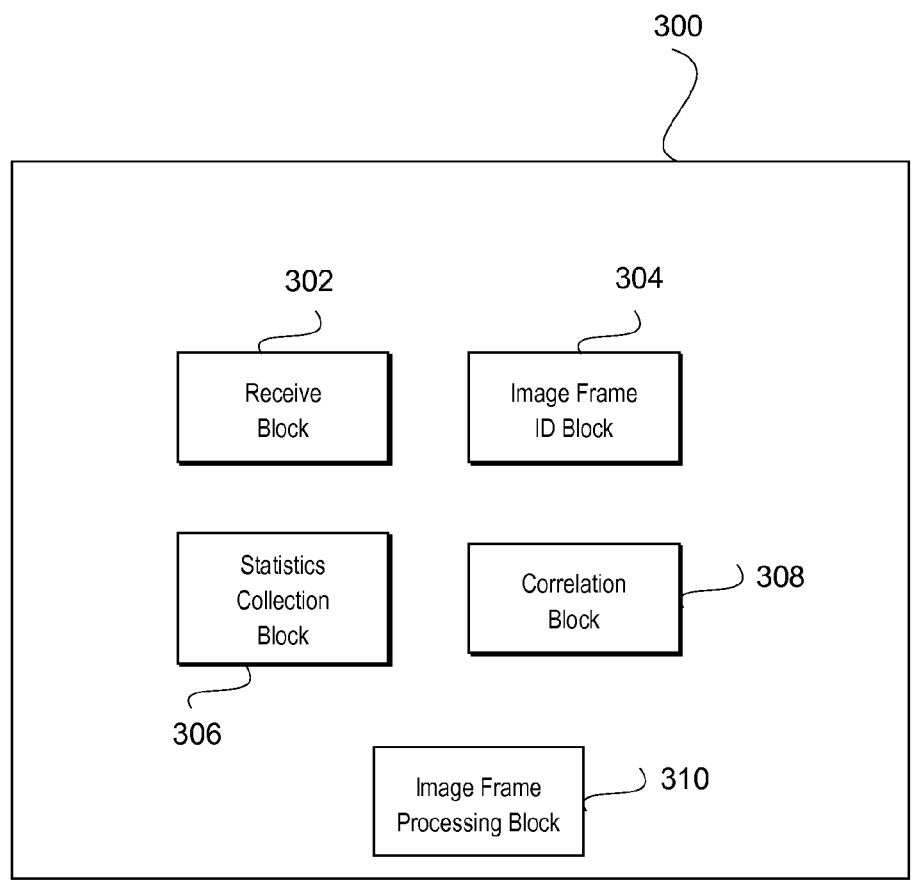
FIG. 3 is a block diagram of an exemplary apparatus for providing the image statistics collection system, in accordance with various embodiments of the present invention.

Referring to FIG. 3, an example of an apparatus 300 for implementation of the present invention is schematically illustrated. The apparatus 300 may consist of one or more semiconductor chips known in the art. The apparatus 300 may be configured with firmware and/or software to perform various operations as described herein in accordance with various embodiments of the present invention. The apparatus 300 may include a receive block 302 for receiving image frame data from a camera sensor. An image frame ID block 304 may be provided in order to determine an image frame ID for the received image frame data. The image frame ID block 304 may also temporarily store the image frame ID if desired, or a separate block may be provided for this purpose if desired. A statistics collection block 306 may be provided for collecting image statistics from the image frame. A correlation block 308 may be provided for correlating the image frame ID with the collected image frame statistics. The correlation block 308 may be one or more storage blocks for storing collected image frame statistics and/or image frame data. Alternatively, as previously mentioned, other blocks may serve as the correlation block 308 and perform the correlation. The apparatus may further include an image frame processing block 310 for processing the image frame data, if desired. The correlation block may include temporary storage for the image frame data and may correlate the image frame data with the image frame ID. A DMA (not shown) may also be provided for forwarding the collected image statistics with the correlated image frame ID and the image frame data with the correlated image frame ID to system memory. Once again, those skilled in the art will understand that there are other ways to transfer the image frame statistics and the processed image frame data to the system memory 118. For example, the image frame statistics and the processed image frame data may be transferred to the system memory 118 via programmed input/output (PIO).

Thus, in accordance with various embodiments of the present invention, a unique frame ID may be assigned to each image frame and each collected set of statistics. The statistics may be captured for every frame, every second frame, every third frame, etc., or a random combination of frames, as desired. A system in accordance with the present invention may still match the statistics to the frame without the use of interrupts. Thus, the present invention provides a process that is more reliable and efficient in comparison to the prior art. The system may perform its processing uninterrupted and may read the statistics when it desires and reliably match the statistics to the appropriate frame. A system in accordance with the present invention is generally simpler and more reliable since the system simply reads the frame ID and knows exactly to which frame the statistics belong.

In embodiments of the present invention, an article of manufacture may be employed to implement one or more methods as disclosed herein. For example, in exemplary embodiments, an article of manufacture may comprise a storage medium and a plurality of programming instructions stored in the storage medium and adapted to program an apparatus to enable the apparatus to determine a frame ID for an image frame and to correlate the frame ID with collected statistics for the image frame.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method for correlating an image frame with statistics associated with the image frame, the method comprising:
   receiving an image frame;
   generating statistics associated with the image frame, wherein the statistics associated with the image frame comprises information about the image frame; and
   assigning an identification number to each of (i) the image frame, and (ii) the statistics associated with the image frame,
   wherein the identification number assigned to each of (i) the image frame, and (ii) the statistics associated with the image frame permits correlating the image frame with the statistics associated with the image frame.

2. The method of claim 1, further comprising:
   storing the image frame, along with the assigned identification number; and
   storing the statistics associated with the image frame, along with the assigned identification number.

3. The method of claim 1, wherein the statistics associated with the image frame comprises one or more of a total color intensity value associated with the image frame, a maximum color value associated with the image frame, a minimum color value associated with the image frame, a histogram of received color values associated with the image frame, and dark pixel values for noise characterization associated with the image frame.

4. The method of claim 1, wherein assigning the identification number comprises:
   extracting, from the image frame, the identification number; and
   assigning the extracted identification number to each of (i) the image frame, and (ii) the statistics associated with the image frame.

5. The method of claim 1, wherein assigning the identification number to the image frame comprises:
   based at least in part on receiving the image frame, generating the identification number; and
   assigning the generated identification number to each of (i) the image frame and (ii) the statistics associated with the image frame.

6. The method of claim 1, further comprising:
   storing the image frame, the assigned identification number, and the statistics associated with the image frame at consecutive locations of a memory.

7. The method of claim 1, further comprising:
   forwarding the image frame and the statistics associated with the image frame to a memory at separate times.

8. The method of claim 6, further comprising:
   storing the image frame and the assigned identification number at nonconsecutive locations of a memory.

9. The method of claim 1, wherein the image frame is a first image frame, wherein the identification number is a first identification number, and wherein the method further comprises:
   receiving a second image frame; and
   assigning a second identification number to each of (i) the second image frame, and (ii) the statistics associated with the first image frame,
   wherein the identification number and the second identification number assigned to the statistics associated with the first image frame permits correlating the statistics associated with the first image frame with each of the first image frame and the second image frame.

10. The method of claim 1, wherein the first image frame and the second image frame have at least one common attribute, based on which the statistics associated with the first image frame is associated with the second image frame.

11. An apparatus comprising:
a processor; and
a computer-readable storage medium comprising instructions tangibly stored on the computer-readable storage medium, wherein the instructions are executable by the processor to enable the processor to
receive an image frame,
based at least in part on the image frame, generate statistics associated with the image frame, wherein the statistics associated with the image frame comprises information about the image frame, and
assign an identification number to each of (i) the image frame, and (ii) the statistics associated with the image frame,
wherein the identification number assigned to each of (i) the image frame, and (ii) the statistics associated with the image frame permits correlating the image frame with the statistics associated with the image frame.

12. The apparatus of claim 11, wherein the instructions are executable by the processor to further enable the processor to:
store the image frame, along with the assigned identification number; and
store the statistics associated with the image frame, along with the assigned identification number.

13. The apparatus of claim 11, wherein the statistics associated with the image frame comprises one or more of a total color intensity value associated with the image frame, a maximum color value associated with the image frame, a minimum color value associated with the image frame, a histogram of received color values associated with the image frame, and dark pixel values for noise characterization associated with the image frame.

14. The apparatus of claim 11, wherein the instructions are executable by the processor to further enable the processor to assign the identification number by:
extracting, from the image frame, the identification number; and
assigning the extracted identification number to each of (i) the image frame, and (ii) the statistics associated with the image frame.

15. The apparatus of claim 11, wherein the instructions are executable by the processor to further enable the processor to assign the identification number by:
based at least in part on receiving the image frame, generating the identification number; and
assigning the generated identification number to each of (i) the image frame, and (ii) the statistics associated with the image frame.

16. The apparatus of claim 11, wherein the instructions are executable by the processor to further enable the processor to:
store the image frame, the assigned identification number, and the statistics associated with the image frame at consecutive locations of a memory.

17. The apparatus of claim 11, wherein the instructions are executable by the processor to further enable the processor to:
forward the image frame and the statistics associated with the image frame to a memory at separate times.

18. The apparatus of claim 11, wherein the instructions are executable by the processor to further enable the processor to:
store the image frame and the assigned identification number at nonconsecutive locations of a memory.

19. The apparatus of claim 11, wherein the image frame is a first image frame, wherein the identification number is a first identification number, and wherein the instructions are executable by the processor to further enable the processor to:
receive a second image frame; and
assign a second identification number to each of (i) the second image frame, and (ii) the statistics associated with the first image frame,
wherein the identification number and the second identification number assigned to the statistics associated with the first image frame permits correlating the statistics associated with the first image frame with each of the first image frame and the second image frame.

20. The apparatus of claim 11, wherein the first image frame and the second image frame have at least one common attribute, based on which the statistics associated with the first image frame is also associated with the second image frame.

* * * * *